(12) United States Patent
Huang et al.

(10) Patent No.: US 11,658,567 B2
(45) Date of Patent: May 23, 2023

(54) SWITCHING CAPACITOR POWER CONVERSION CIRCUIT AND CONVERSION CONTROL CIRCUIT AND CONTROL METHOD THEREOF

(71) Applicant: Richtek Technology Corporation, Zhubei (TW)

(72) Inventors: Tsung-Wei Huang, Taipei (TW); Ding-Yu Wei, Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 132 days.

(21) Appl. No.: 17/407,045

(22) Filed: Aug. 19, 2021

(65) Prior Publication Data
US 2022/0131461 A1 Apr. 28, 2022

(30) Foreign Application Priority Data
Oct. 28, 2020 (TW) ................................ 109137482

(51) Int. Cl.
*H02M 3/00* (2006.01)
*H02M 3/07* (2006.01)
*H02M 1/088* (2006.01)

(52) U.S. Cl.
CPC ............. *H02M 3/07* (2013.01); *H02M 1/088* (2013.01)

(58) Field of Classification Search
CPC ........... H02M 3/07; H02M 1/088; H02M 1/36
See application file for complete search history.

(56) References Cited

U.S. PATENT DOCUMENTS

2016/0099593 A1* 4/2016 Lim ...................... H02J 7/0048
320/114
2019/0252896 A1* 8/2019 Huang ...................... H02J 7/00

\* cited by examiner

*Primary Examiner* — Adolf D Berhane
*Assistant Examiner* — Afework S Demisse
(74) *Attorney, Agent, or Firm* — Tung & Associates

(57) ABSTRACT

A switching capacitor power conversion circuit includes: a conversion capacitor, plural conversion transistors and an output capacitor connected to an output node. In a switching conversion mode, the switching capacitor power conversion circuit switches connections of the capacitor to convert the input power into an output power on an output node. During a first pre-charging period, a first conversion transistor is controlled to provide a first pre-charging current to pre-charge the conversion capacitor to a predetermined voltage level, and the output capacitor is prevented from being charged. During a second pre-charging period, a second conversion transistor is controlled to provide a second pre-charging current to pre-charge the output capacitor to the predetermined voltage level, and the second pre-charging current supplies a load current to a load circuit.

31 Claims, 7 Drawing Sheets

SWITCHING CAPACITOR POWER CONVERSION CIRCUIT AND CONVERSION CONTROL CIRCUIT AND CONTROL METHOD THEREOF

CROSS REFERENCE

The present invention claims priority to TW 109137482 filed on Oct. 28, 2020.

BACKGROUND OF THE INVENTION

Field of Invention

The present invention relates to a switching capacitor power conversion circuit; particularly, it relates to such switching capacitor power conversion circuit which is capable of being pre-charged to reduce surge current. The present invention also relates to a conversion control circuit and a conversion control method for controlling such switching capacitor power conversion circuit.

Description of Related Art

Please refer to FIG. 1A and FIG. 1B, which show schematic diagrams of a conventional switching capacitor power conversion circuits (i.e., switching capacitor power conversion circuit 101A wherein the conversion control circuit 20 is illustrated in the form of a block diagram and switching capacitor power conversion circuit 101B wherein the conversion control circuit 20 is illustrated in the form of specific circuitry). In the switching capacitor power conversion circuits 101A and 101B, the conversion transistors Q1~Q4 switch electrical connections of the conversion capacitor CF to convert an input power to an output power.

The prior art shown in FIG. 1A and FIG. 1B has the following drawbacks that: when a voltage across the conversion capacitor CF and a voltage across an output capacitor Cout are greatly different from the voltages they should be in steady state, to form switching capacitor power conversion will result, which may damage the conversion transistors.

As compared to the prior art in FIG. 1A and FIG. 1B, the present invention is advantageous in that: the switching capacitor power conversion circuit of the present invention can pre-charge the conversion capacitor CF and the output capacitor Cout before switching to operating in the conversion mode to avoid generating the above-mentioned surge current, and the present invention can support start-up operation of a load circuit under heavy load condition by a relatively smaller pre-charging current.

SUMMARY OF THE INVENTION

From one perspective, the present invention provides a switching capacitor power conversion circuit, comprising: a conversion capacitor; a plurality of conversion transistors, which are coupled to the conversion capacitor, wherein the plurality of conversion transistors are configured to operate so as to convert an input power to an output power at an output node; and an output capacitor, which is coupled to the output node; wherein in a switching conversion mode, the plurality of conversion transistors are configured to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times of a level of a voltage of the output power, whereas, a level of a current of the input power is 1/k times of a level of a current of the output power, wherein k is a real number greater than one; wherein in a pre-charging mode, the switching capacitor power conversion circuit is configured to operably perform following pre-charging operations, wherein: during a first pre-charging period, the switching capacitor power conversion circuit is configured to operably control a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and during a second pre-charging period, the switching capacitor power conversion circuit is configured to operably control a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit; wherein the first pre-charging current is not greater than a first predetermined current level, whereas, the second pre-charging current is not greater than a second predetermined current level, and wherein the load current is not smaller than a third predetermined current level.

In one embodiment, the switching conversion mode is performed after the pre-charging mode.

In one embodiment, the first pre-charging period is earlier than the second pre-charging period.

In one embodiment, during a balance period, the switching capacitor power conversion circuit is further configured to operably control the first conversion transistor and the second conversion transistor, so as to balance a voltage of the conversion capacitor and a voltage of the output capacitor to the predetermined voltage level.

In one embodiment, the first conversion transistor and the second conversion transistor are connected in series to each other, wherein an end of the conversion capacitor, an end of the first conversion transistor and an end of the second conversion transistor are coupled to a switching node, wherein the output capacitor is coupled to another end of the second conversion transistor, and wherein during the second pre-charging period, the first conversion transistor is configured to operably supply at least the second pre-charging current to the switching node.

In one embodiment, the first predetermined current level is equal to the second predetermined current level, and wherein the load current is smaller than the second pre-charging current.

In one embodiment, in the pre-charging mode, the first conversion transistor is configured as a current source or a current clamper circuit, which is configured to operably supply the first pre-charging current.

In one embodiment, during the second pre-charging period, the second conversion transistor is configured as a current source or a current clamper circuit, which is configured to operably supply the second pre-charging current.

In one embodiment, it is determined whether a short circuit or a current leakage occurs in the conversion capacitor according to whether a voltage at a low-voltage end of the conversion capacitor exceeds a voltage threshold.

In one embodiment, subsequent to the second pre-charging period, it is determined whether a short circuit or a current leakage occurs in the output capacitor or whether the pre-charging operation on the output capacitor is unable to be finished according to whether the output voltage does not exceed a voltage threshold.

In one embodiment, the switching capacitor power conversion circuit is configured as the following: the first conversion transistor, the second conversion transistor, a third conversion transistor and a fourth conversion transistor of the plurality of conversion transistors are connected in series in the listing order between the input power and the ground level, wherein the first conversion transistor and the second conversion transistor are coupled to an end of the conversion capacitor, whereas, the third conversion transistor and the fourth conversion transistor are coupled to another end of the conversion capacitor, and wherein the second conversion transistor, the third conversion transistor and the output capacitor are commonly coupled to the output node; wherein in the switching conversion mode, the first conversion transistor, the second conversion transistor, the third conversion transistor and the fourth conversion transistor are configured to operably switch, such that the conversion capacitor is periodically electrically connected between the input power and the output node and the conversion capacitor is periodically electrically connected between the output node and the ground level, whereby the level of the voltage of the input power is two times the level of the voltage of the output power, whereas, the level of the current of the input power is ½ times the level of the current of the output power.

In one embodiment, in the switching conversion mode: the voltage of the input power is a constant voltage and the voltage of the output power is also a constant voltage; or the current of the input power is a constant current and the current of the output power is also a constant current.

From another perspective, the present invention provides a conversion control circuit, which is configured to operably control a conversion capacitor and an output capacitor, so as to convert an input power to an output power at an output node, wherein the output capacitor is coupled to the output node; the conversion control circuit comprising: a plurality of conversion transistors, which are coupled to the conversion capacitor; a pre-charging control circuit, which is configured to operably control the plurality of conversion transistors in a pre-charging mode; and a switching control circuit, which is configured to operably control the plurality of conversion transistors in a witching conversion mode; wherein in the switching conversion mode, the plurality of conversion transistors are configured to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times a level of a voltage of the output power, whereas, a level of a current of the input power is 1/k times of a level of a current of the output power, wherein k is a real number greater than one; wherein in the pre-charging mode, the pre-charging control circuit is configured to operably control the plurality of conversion transistors to perform following pre-charging operations, wherein: during a first pre-charging period, the switching capacitor power conversion circuit is configured to operably control a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and during a second pre-charging period, the switching capacitor power conversion circuit is configured to operably control a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit; wherein the first pre-charging current is not greater than a first predetermined current level, whereas, the second pre-charging current is not greater than a second predetermined current level, and wherein the load current is not smaller than a third predetermined current level.

From yet another perspective, the present invention provides a control method, which is configured to operably control operations of the plurality of conversion transistors, a conversion capacitor and an output capacitor, so as to convert an input power to an output power at an output node, wherein the output capacitor is coupled to the output node; the control method comprising: in a switching conversion mode, controlling the plurality of conversion transistors to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times of a level of a voltage of the output power, whereas, a level of a current of the input power is 1/k times of a level of a current of the output power, wherein k is a real number greater than one; in a pre-charging mode, controlling the plurality of conversion transistors to perform a pre-charging operation, wherein the pre-charging operation includes following steps: during a first pre-charging period, controlling a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and during a second pre-charging period, controlling a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit; wherein the first pre-charging current is not greater than a first predetermined current level, whereas, the second pre-charging current is not greater than a second predetermined current level, and wherein the load current is not smaller than a third predetermined current level.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
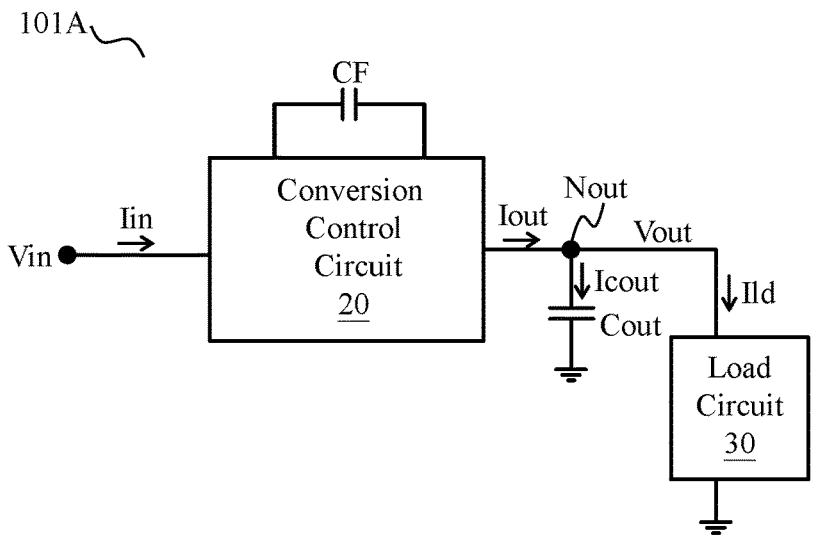
FIG. 1A and FIG. 1B show a schematic diagram of a conventional switching capacitor power conversion circuit.
Figure 1B:
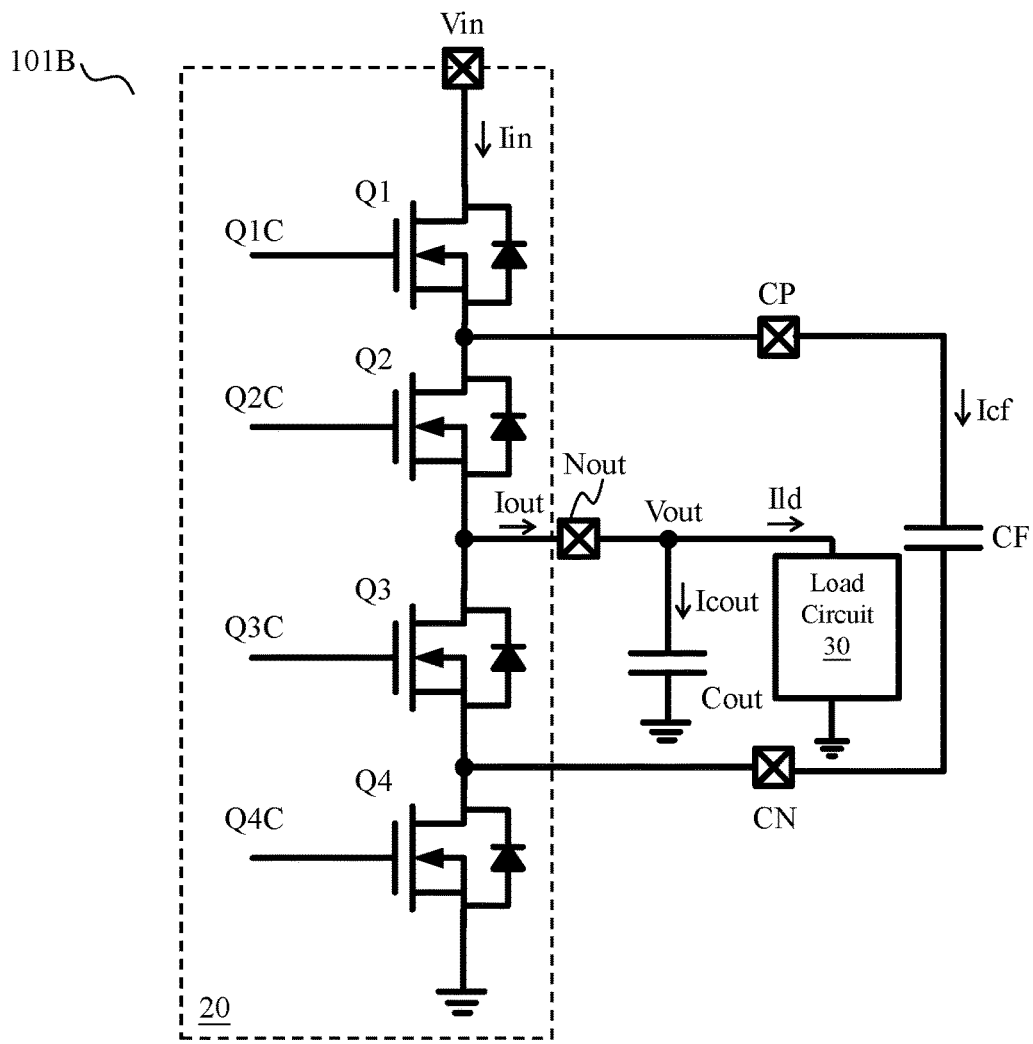
Figure 2:
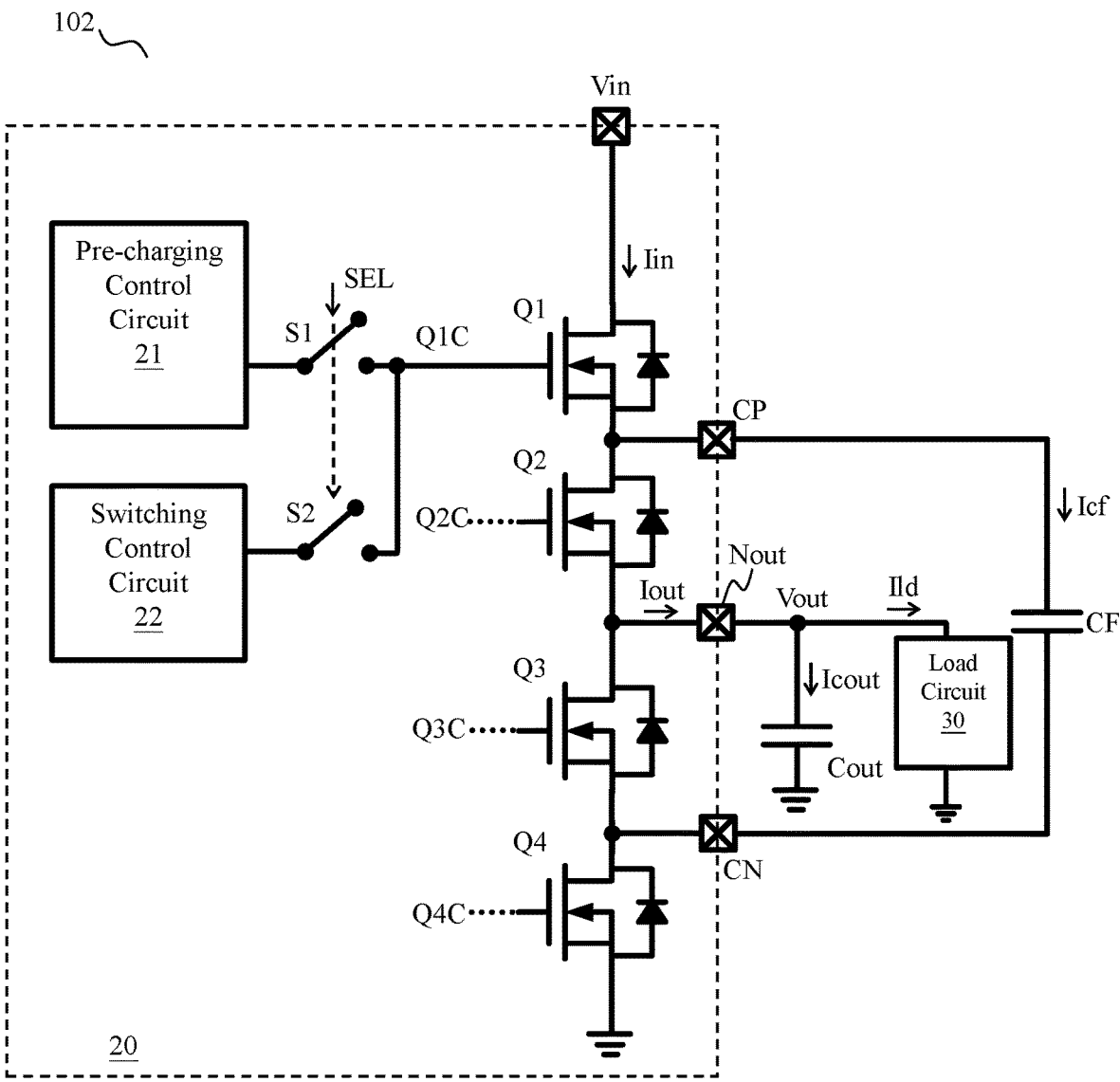
FIG. 2 shows a schematic block diagram of a switching capacitor power conversion circuit according to an embodiment of the present invention.

Please refer to FIG. 2, which shows a schematic block diagram of a switching capacitor power conversion circuit (i.e., switching capacitor power conversion circuit 102) according to an embodiment of the present invention. In one embodiment, as shown in FIG. 2, the switching capacitor power conversion circuit 102 comprises: a conversion capacitor CF, plural conversion transistors (e.g., as shown by conversion transistors Q1~Q4 in FIG. 2) and an output capacitor Cout. In this embodiment, as shown in FIG. 2, the conversion transistors Q1~Q4 are connected in series between an input power and a ground level. The conversion transistor Q1 and the conversion transistor Q2 are coupled to one end (the switching node CP in FIG. 2) of the conversion capacitor CF, whereas, the conversion transistor Q3 and the conversion transistor Q4 are coupled to the other end (the switching node CN in FIG. 2) of the conversion capacitor CF. The conversion transistor Q2, the conversion transistor Q3 and the output capacitor Cout are coupled commonly to the output node Nout. Switching conversion signals Q1C~Q4C are configured to operably control the conversion transistors Q1~Q4, respectively.

In one embodiment, the switching capacitor power conversion circuit 102 has two operation modes: a pre-charging mode and a switching conversion mode. The conversion transistors Q1~Q4 in the switching capacitor power conversion circuit 102 can be controlled by a pre-charging control circuit 21 in the pre-charging mode to perform a pre-charging operation, and the conversion transistors Q1~Q4 in the switching capacitor power conversion circuit 102 can be controlled by a switching control circuit 22 in the switching conversion mode to perform a switching power conversion operation switching power conversion. A mode switching signal SEL is configured to operably control selection switches S1 and h S2, so as to determine how the conversion transistors Q1~Q4 should operate.

Please still refer to FIG. 2. According to the present invention, in the switching conversion mode, the switching capacitor power conversion circuit 102 can convert the input power to an output power through switching electrical connections of the conversion capacitor CF by the conversion transistors Q1~Q4 in FIG. 2. More specifically, in this embodiment, in the switching conversion mode, the conversion transistor Q1, the conversion transistor Q2, the conversion transistor Q3 and the conversion transistor Q4 are switched individually, such that the conversion capacitor CF is electrically connected between the input power and the output node Nout and the conversion capacitor CF is electrically connected between the output node Nout and the ground level in an alternating manner, thereby converting the input power to the output power. The input power has an input voltage and an input current, whereas, the output power has an output voltage and an output current. More specifically, in this embodiment, through the above-mentioned operation of switching power conversion, the input voltage Vin is two times of the output voltage, whereas, the input current is ½ times of the output current.

Figure 3:
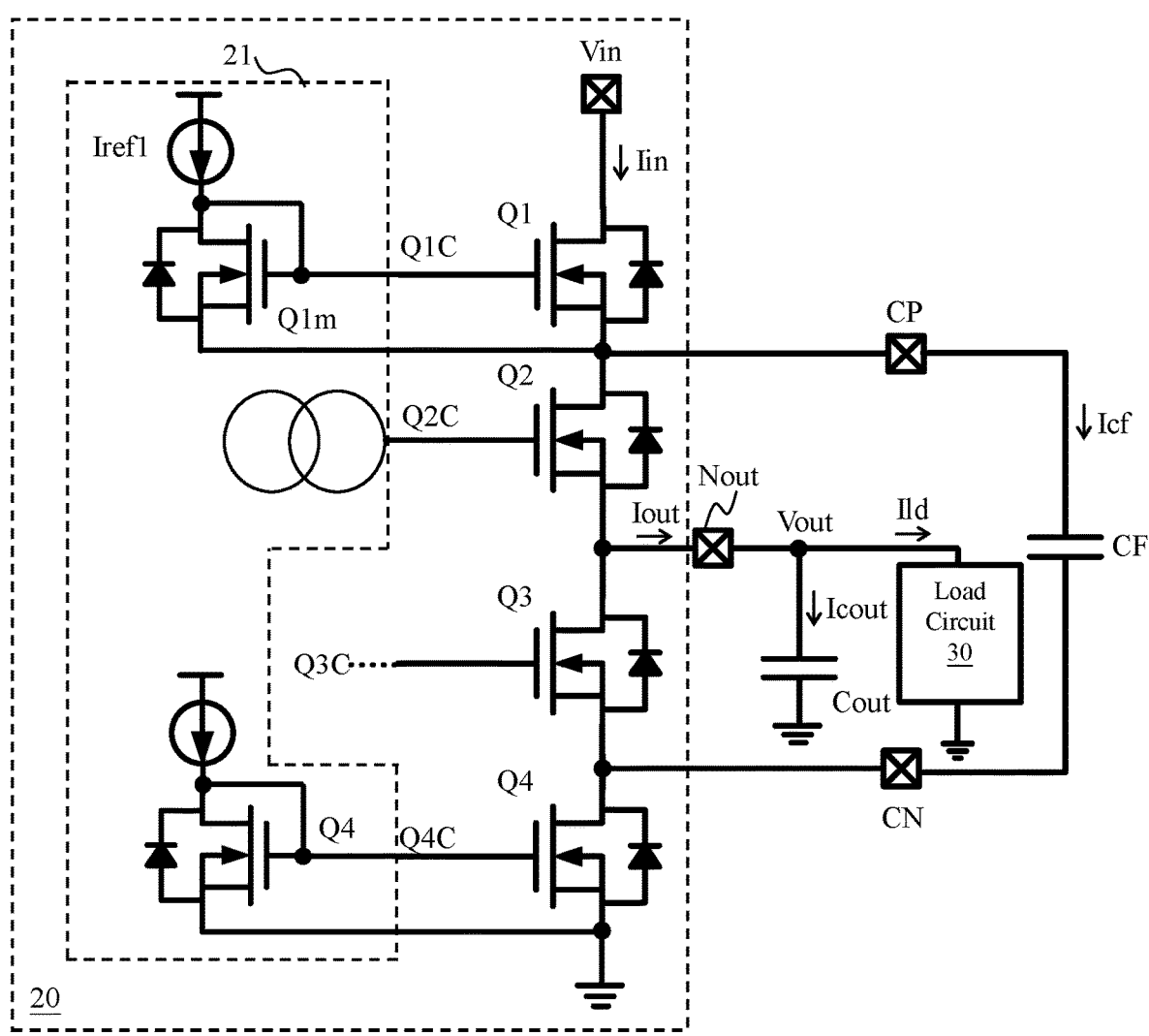
FIG. 3 shows a schematic diagram of a switching capacitor power conversion circuit according to a specific embodiment of the present invention.
Figure 4:
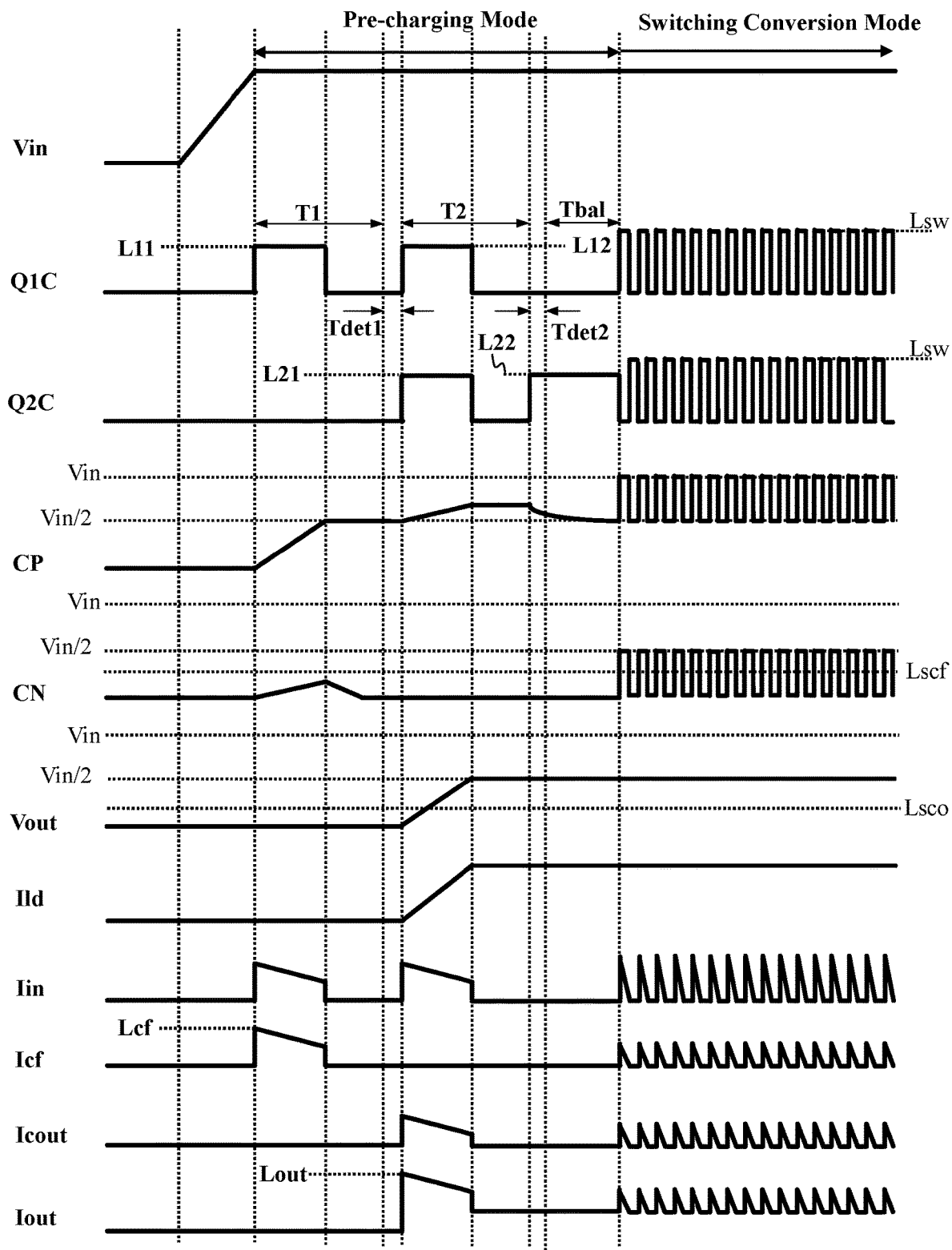
FIG. 4 illustrates a waveform diagram depicting the operation of a switching capacitor power conversion circuit of the present invention.

Please refer to FIG. 2 along with FIG. 3 and FIG. 4. FIG. 3 shows a schematic diagram of a switching capacitor power conversion circuit (i.e., switching capacitor power conversion circuit 103) according to a specific embodiment of the present invention. FIG. 4 illustrates a waveform diagram depicting the operation of a switching capacitor power conversion circuit of the present invention. In one embodiment, as shown in FIG. 3, in a pre-charging mode, the conversion transistor Q1 of the switching capacitor power conversion circuit 103 can be configured to form a current mirror circuit. During a first pre-charging period (e.g., as shown by T1 in FIG. 4), the current mirror circuit provides a first pre-charging current to pre-charge the conversion capacitor CF to a predetermined voltage level, but does not charge the output capacitor Cout during the first pre-charging period T1. More specifically, in this embodiment, referring to FIG. 4, the first pre-charging current corresponds to a current Icf within the first pre-charging period T1, and the predetermined voltage level corresponds to the voltage level Vin/2, which is the voltage level that the switching node CP is pre-charged to within the first pre-charging period T1.

In one embodiment, during the first pre-charging period T1, the conversion transistor Q2 is controlled to be OFF. As shown in FIG. 4, the conversion control signal Q2C is at a low level so that the conversion transistor Q2 is OFF, thus preventing the output capacitor Cout from being charged.

Next, during a second pre-charging period (e.g., as shown by T2 in FIG. 4), the pre-charging control circuit 21 controls the second conversion transistor Q2 to provide a second pre-charging current via the output node Nout, to pre-charge the output capacitor Cout to the above-mentioned predetermined voltage level Vin/2. Besides, the second pre-charging current also supplies a load current Ild to a load circuit 30. More specifically, in this embodiment, as shown in FIG. 4, the second pre-charging current corresponds to a current Iout within the second pre-charging period T2. The second pre-charging current supplies both a current Icout for charging the output capacitor Cout and the load current Ild to the load circuit 30. Besides, as shown in FIG. 4, a positive end (corresponding to the switching node CP) of the output capacitor Cout is pre-charged to the above-mentioned predetermined voltage level Vin/2 during the second pre-charging period T2.

More specifically, in this embodiment, as shown in FIG. 3, in the pre-charging mode, a current control transistor Q1m is configured to operably generate a conversion control signal Q1C (e.g., as shown by a voltage level L11 within T1 in FIG. 4) according to a reference current source Iref1, so as to control the conversion transistor Q1 to generate the above-mentioned first pre-charging current (e.g., as shown by a current Iin or a current Icf within T1 in FIG. 4). In addition, in the pre-charging mode, a conversion control signal Q2C can control the conversion transistors Q2 to operate as a current mirror circuit, so as to generate the above-mentioned second pre-charging current (e.g., as shown by a current Iout within T2 in FIG. 4). More specifically, in this embodiment, as shown in FIG. 3, during the second pre-charging period T2, the conversion control signal Q2C (e.g., as shown by a voltage level L21 within T2 in FIG. 4) is generated from another current mirror circuit and is configured to operably control the conversion transistors Q2, so as to generate the above-mentioned second pre-charging current (e.g., as shown by the current Iout within T2 in FIG. 4). It is noteworthy that, for simplicity in explanation, the embodiment shown in FIG. 3 is a simplified version of the embodiment shown in FIG. 2 wherein the above-mentioned selection switches S1 and S2 are omitted from FIG. 3, and the conversion transistors Q1~Q4 are simply shown to be controlled by the pre-charging control circuit 21.

In one embodiment, while the conversion capacitor CF is being pre-charged, a current limit can be set on a current flow-out end of the conversion capacitor CF. More specifically, in one embodiment, as shown in FIG. 3, in the pre-charging mode, a current control transistor Qom is configured to operably generate a conversion control signal Q4C according to a reference current source, so as to control the conversion transistor Q4, thereby generating a current having a same level as the above-mentioned first pre-charging current.

As described above, the present invention performs two separate pre-charging operations in two separate pre-charging periods, wherein during the first pre-charging period T1, pre-charging is only performed on the conversion capacitor CF to pre-charge the conversion capacitor CF to the predetermined voltage level, whereas the output capacitor Cout is not pre-charged, and because the output voltage Vout still remains at a low level in the first pre-charging period T1, the load circuit 30 does not drain any current. In other words, during the first pre-charging period T1, the first pre-charging current supplied by the conversion transistors Q1 is solely used to pre-charge the conversion capacitor CF. It is during the second pre-charging period T1 that the first pre-charging current supplied by the conversion transistors Q1 will be adopted to pre-charge both the conversion capacitor CF and the output capacitor Cout, and to supply the load current Ild to the load circuit 30.

In one embodiment, the above-mentioned first pre-charging current is not greater than a first predetermined current level. In one embodiment, the above-mentioned first predetermined current level is correlated with a current upper limit of the conversion transistors Q1 in the pre-charging mode, to avoid damaging the conversion transistor Q1.

In one embodiment, the above-mentioned second pre-charging current is not greater than a second predetermined current level. In one embodiment, the above-mentioned second predetermined current level is correlated with a current upper limit of the conversion transistors Q2 in the pre-charging mode, to avoid damaging the conversion transistor Q2.

In one embodiment, the load current Ild is not smaller than a third predetermined current level. In one embodiment, the above-mentioned third predetermined current level is correlated with a current required for the load circuit 30 to re-boot in a heavy load condition.

In one embodiment, a sum of the first pre-charging period T1 plus the second pre-charging period T2 is smaller than a pre-charging period limit. In other words, it is required to finish the pre-charging operation during the above-mentioned pre-charging period limit.

It is noteworthy that, according to the above-mentioned feature of the present invention wherein during the first pre-charging period T1, pre-charging operation is only performed on the conversion capacitor CF whereas the output capacitor Cout is not pre-charged, the load current Ild is not supplied to a load circuit 30 during the first pre-charging period T1. As compared to the prior art wherein both the conversion capacitor CF and the output capacitor Cout are pre-charged and a load current is supplied to the load circuit 30 during the pre-charging period, the above-mentioned feature of the present invention is advantageous in that: the present invention can finish the pre-charging operation during the above-mentioned pre-charging period limit, while in the meantime also satisfy the requirement for the load circuit 30 to be capable of re-booting in a heavy load condition.

In one embodiment, the first predetermined current level (e.g., as shown by Lcf in FIG. 4) is equal to the second predetermined current level (e.g., as shown by Lout in FIG. 4). In one embodiment, the load current Ild is smaller than the second pre-charging current, such that the second pre-charging current can supply the load current Ild, and in addition can pre-charge the output capacitor Cout to a predetermined voltage level during the above-mentioned pre-charging period limit.

Preferably, the first pre-charging current and the second pre-charging current should be greater than respective corresponding current lower limits, so that the present invention can finish the pre-charging operation during the above-mentioned pre-charging period limit.

Please still refer to FIG. 4. In this embodiment, after the pre-charging operation is completed, the switching capacitor power conversion circuit (e.g., switching capacitor power conversion circuit 103) will switch to a switching conversion mode wherein the switching capacitor power conversion circuit 103 will convert an input power to an output power by operating the conversion transistors Q1~Q4. As an example, with reference to FIG. 4, the conversion control signals Q1C and Q2C are switched between a low voltage level and a high voltage level (Lsw), so as to control the conversion transistors Q1 and Q2 to correspondingly perform switching capacitor power conversion.

In one embodiment, as shown in FIG. 4, during a balance period Tbal, the switching capacitor power conversion circuit (e.g., switching capacitor power conversion circuit 103) is further configured to operably control the conversion transistor Q1 and the conversion transistor Q2, so as to balance a voltage of the conversion capacitor CF and a voltage of the output capacitor Cout to a predetermined voltage level (e.g., as shown by Vin/2 in FIG. 4). In one embodiment, this is achieved by controlling the conversion transistor Q2 during the balance period Tbal, such that the current through the conversion transistor Q2 has a current level equal to the above-mentioned second pre-charging current, to operably balance the voltage of the conversion capacitor CF and the voltage of the output capacitor Cout. In the example shown in FIG. 4, during the balance period Tbal, the conversion control signal Q2C is controlled to be at a voltage level of L22. In one embodiment, L22 is equal to L21.

Please refer to FIG. 2 and FIG. 4. In this embodiment, the conversion transistor Q1 and the conversion transistor Q2 are connected in series to each other. During the second pre-charging period T2, the conversion transistor Q1 is also required to supply at least the second pre-charging current to the switching node (e.g., as shown by CP in FIG. 2), such that the conversion transistor Q2 will be able to supply the second pre-charging current to the output node Nout. In the example shown in FIG. 4, during the second pre-charging period T2, the conversion control signal Q1C is controlled to be at a voltage level of L12. In one embodiment, L12 is equal to L11.

Please still refer to FIG. 4. In one embodiment, subsequent to the first pre-charging period T1, it is determined whether a short circuit or a current leakage occurs in the conversion capacitor CF according to whether a voltage at a low-voltage end (i.e., the switching node CN) of the conversion capacitor CF exceeds a voltage threshold Lscf. As shown in FIG. 4, in this embodiment, the voltage at the switching node CN does not exceed the voltage threshold Lscf during a period Tdet1, so it is determined that a short circuit or a current leakage does not occur within the conversion capacitor CF, and the switching capacitor power conversion circuit 102 can keep on its operation. On the other hand, if the voltage at the switching node CN exceeds the voltage threshold Lscf during the period Tdet1, it is determined abnormal and the switching capacitor power conversion circuit 102 can be shut down, or, an alarm can be issued to the system or a user.

Please still refer to FIG. 4. In one embodiment, subsequent to the second pre-charging period T2, it is determined whether a short circuit or a current leakage occurs in the output capacitor Cout or whether the pre-charging operation on the output capacitor Cout cannot be finished according to whether the output voltage Vout does not exceed a voltage threshold Lsco. As shown in FIG. 4, in this embodiment, the output voltage Vout has already exceeded a voltage threshold Lsco during the period Tdet2, so it is determined that a short circuit or a current leakage does not occur in the output capacitor Cout, and the switching capacitor power conversion circuit 102 can keep on its operation. On the other hand, if the output voltage Vout does not exceed the voltage threshold Lsco during the period Tdet2, it is determined abnormal and the switching capacitor power conversion circuit 102 can be shut down, or, an alarm can be issued to the system or a user.

Please refer to FIG. 2. In one embodiment, the conversion transistors (e.g., as shown by the conversion transistors Q1~Q4 in FIG. 2), the pre-charging control circuit 21, the switching control circuit 22 and the selection switches S1 and S2 can be integrated into an integrated circuit (i.e., as shown by the conversion control circuit 20 in FIG. 2). In one embodiment, the output node Nout corresponds to an output pin of the conversion control circuit 20. The switching node CP and the switching node CN correspond to a conversion positive pin and a conversion negative pin of the conversion control circuit 20, respectively. The input power (i.e., Vin) corresponds to a power input pin of the conversion control circuit 20.

Figure 5:
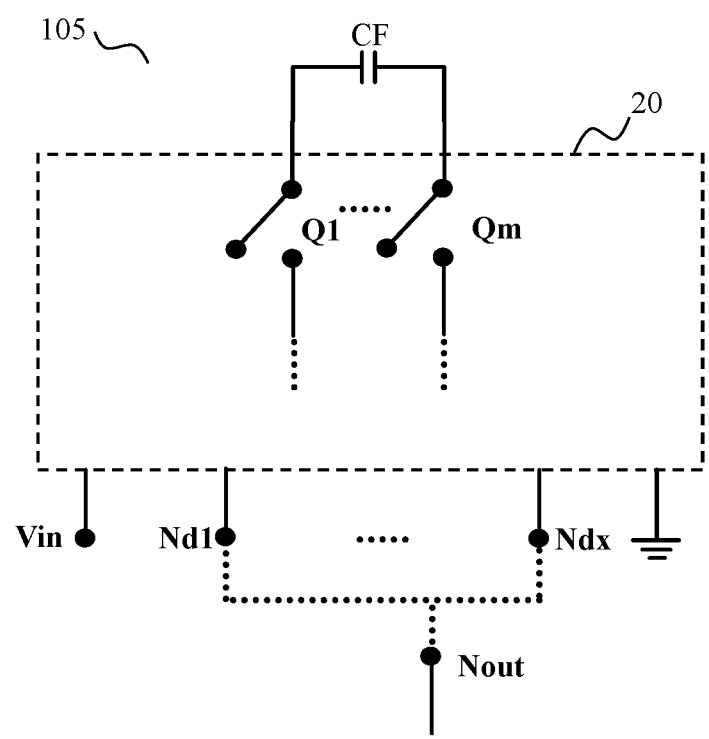
FIG. 5 shows a schematic diagram of a switching capacitor power conversion circuit according to an embodiment of the present invention.

Please refer to FIG. 5, which shows a schematic diagram of a switching capacitor power conversion circuit (i.e., switching capacitor power conversion circuit 105) according to an embodiment of the present invention. In addition to the above-mentioned embodiments shown in FIG. 2 and FIG. 3, the spirit of the present invention can cover a broader scope. The switching capacitor power conversion circuit 105 comprises: at least one conversion capacitor CF, plural conversion transistors (e.g., as shown by conversion transistors Q1~Qm in FIG. 5, wherein m is a positive integer greater than one) and an output capacitor Cout. In this embodiment, in a switching conversion mode, the conversion transistors Q1~Qm are configured to operably and periodically switch such that the conversion capacitor CF is periodically electrically connected between one of the at least one divided-voltage node (e.g., as shown by Nd1~Ndx in FIG. 5) and the input power, or between a pair of the divided-voltage nodes Nd1~Ndx (in an implementation wherein there are plural divided-voltage nodes), or between one of the at least one divided-voltage node (e.g., as shown by Nd1~Ndx in FIG. 5) and the ground level, thereby converting the input power to the output power at the output node Nout. The output node Nout corresponds to anode of the at least one divided-voltage node (e.g., as shown by Nd1~Ndx in FIG. 5), wherein x is greater than or equal to one. In this embodiment, through the above-mentioned operation of switching power conversion, in a steady state, the level of the input voltage Vin is k times of the level of the output voltage Vout, whereas, the level of a current of the input power is 1/k times of the level of a current of the output power, wherein k is a real number greater than one.

In one embodiment, the number of the conversion capacitor is not limited to one; there can be plural conversion capacitors. Under such implementation wherein there are plural conversion capacitors, these conversion capacitors can conduct the above-mentioned operation of capacitor power conversion in an interleaving fashion. Under such situation, pre-charging operations on these conversion capacitors can be performed in a sequential order or simultaneously, either of which is practicable and can be designed depending upon practical application conditions.

Please refer to FIG. 5 along with FIG. 2. From one perspective, the switching capacitor power conversion circuit 102 is a special case of the switching capacitor power conversion circuit 105. The switching capacitor power conversion circuit 102 has one divided-voltage node, which corresponds to the above-mentioned output node Nout, and the switching capacitor power conversion circuit 102 has a current amplification fold k which is equal to two.

Besides, in one embodiment, the predetermined voltage level described in the above-mentioned pre-charging operations is correlated with the output voltage Vout and the real number k.

Figure 6:
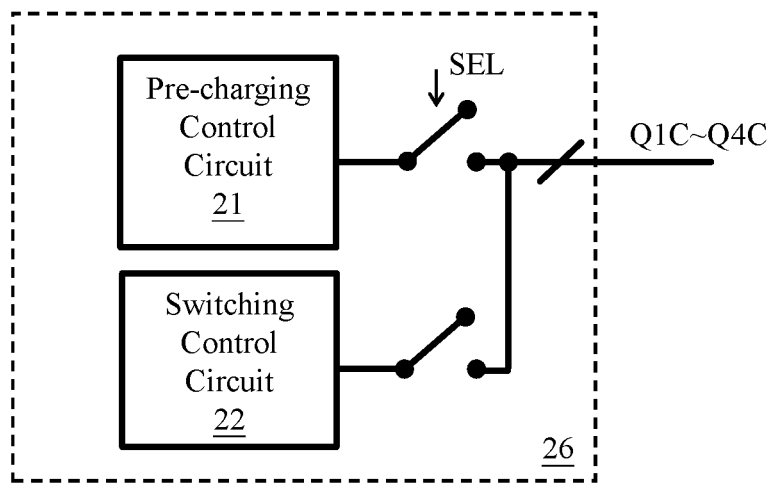
FIG. 6 shows an embodiment of a sub-conversion control circuit.

Please refer to FIG. 6, which shows an embodiment of a sub-conversion control circuit (i.e., sub-conversion control circuit 26). In one embodiment, the pre-charging control circuit 21, the switching control circuit 22 and the selection switches S1 and S2 can be integrated into an integrated circuit (i.e., as shown by a sub-conversion control circuit 26 in FIG. 6). In one embodiment, the sub-conversion control circuit 26 is configured to operably generate the above-mentioned conversion control signals Q1C~QmC for controlling the conversion transistors Q1~Qm, respectively.

Figure 7:
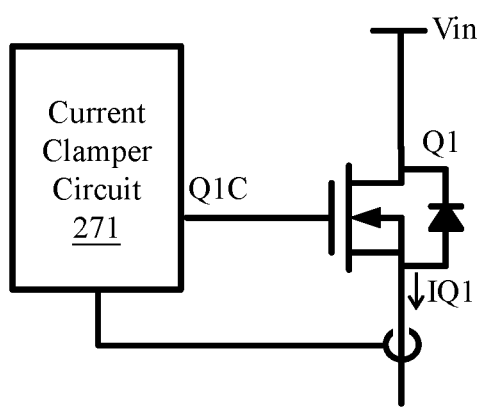
FIG. 7 shows another specific embodiment of a pre-charging control circuit.

Please refer to FIG. 7, which shows another specific embodiment of a pre-charging control circuit (i.e., pre-charging control circuit 27). In one embodiment, as shown in FIG. 7, the pre-charging control circuit 27 includes a current clamper circuit 271. The current clamper circuit 271 is configured to operably generate a conversion control signal Q1C (e.g., as shown by the voltage level L11 or voltage level L12 in FIG. 4) for controlling the conversion transistor Q1 according to a current IQ1 flowing through the conversion transistor Q1, thus generating the above-mentioned first pre-charging current (e.g., as shown by the current Iin or the current Icf in FIG. 4). As for the other conversion transistors (e.g., the conversion transistor Q2), these transistors can also be controlled via the above-mentioned clamping mechanism (e.g., as shown by the voltage level L21 or voltage level L22 in FIG. 4).

Figure 8:
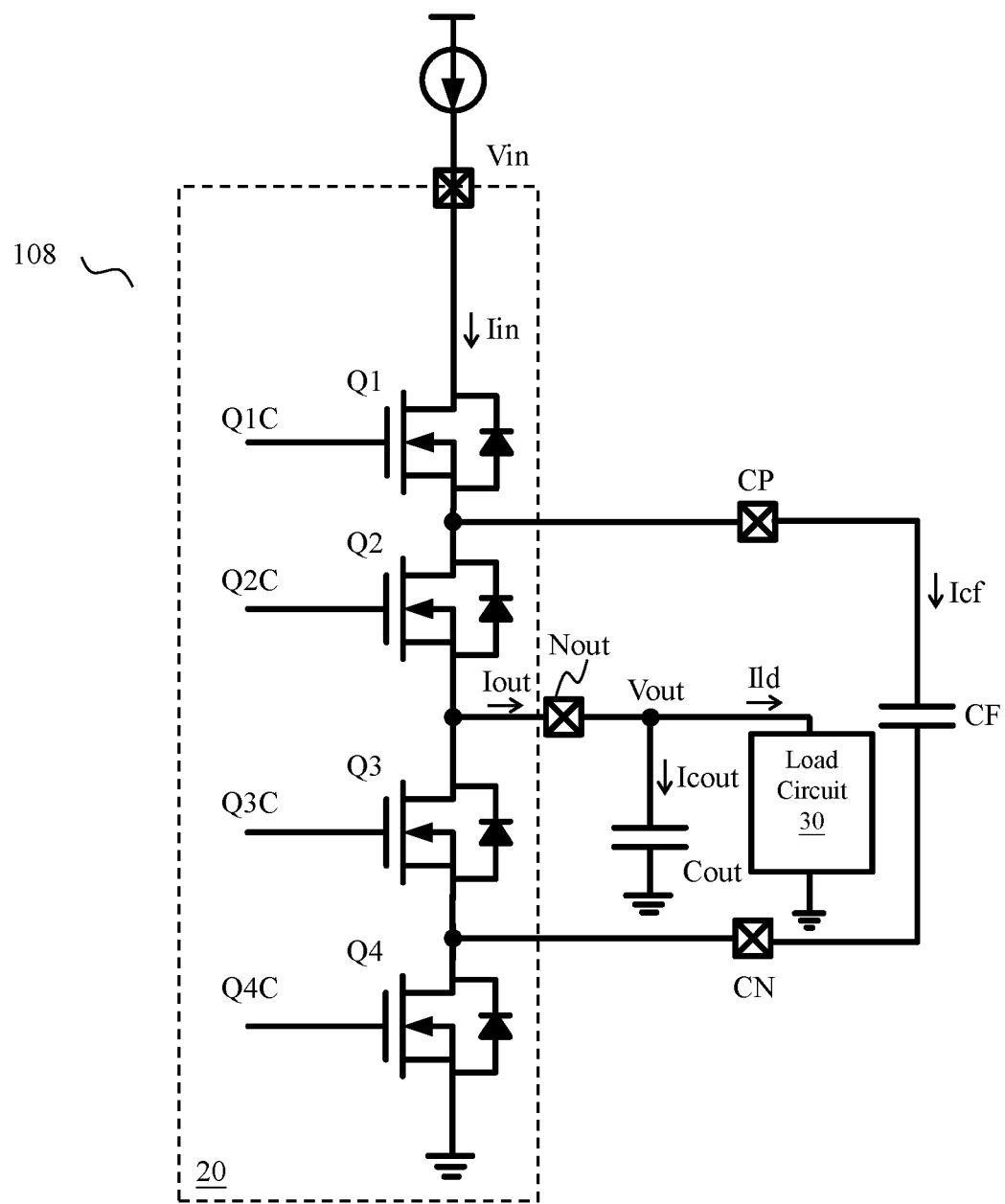
FIG. 8 shows a schematic diagram of a switching capacitor power conversion circuit according to another embodiment of the present invention.

Please refer to FIG. 8, which shows a schematic diagram of a switching capacitor power conversion circuit (i.e., switching capacitor power conversion circuit 108) according to another embodiment of the present invention. In one embodiment, as shown in FIG. 8, in a switching conversion mode, an input power is supplied to the switching capacitor power conversion circuit 108 in the form of a constant current (e.g., as shown by the input current Iin in FIG. 4). Under such circumstance, in the switching conversion mode, the input current Iin is a constant current and an output current Iout is also a constant current, and the relationship between the input current Iin and the output current Iout will keep the k fold relationship (the level of the input current Iin is k times of the level of the output current Iout, wherein k is 2 in this embodiment. In this embodiment, the load circuit 30 for example can be a rechargeable battery.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching capacitor power conversion circuit, comprising:
   a conversion capacitor;
   a plurality of conversion transistors, which are coupled to the conversion capacitor, wherein the plurality of conversion transistors are configured to operate so as to convert an input power to an output power at an output node; and
   an output capacitor, which is coupled to the output node;
   wherein in a switching conversion mode, the plurality of conversion transistors are configured to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times of a level of a voltage of the output power, whereas, a level of a current of the input power is 1/k times of a level of a current of the output power, wherein k is a real number greater than one;
   wherein in a pre-charging mode, the switching capacitor power conversion circuit is configured to operably perform following pre-charging operations, wherein:
   during a first pre-charging period, the switching capacitor power conversion circuit is configured to operably control a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and
   during a second pre-charging period, the switching capacitor power conversion circuit is configured to operably control a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit;
   wherein the first pre-charging current is not greater than a first predetermined current level, whereas, the second pre-charging current is not greater than a second predetermined current level, and wherein the load current is not smaller than a third predetermined current level.

2. The switching capacitor power conversion circuit of claim 1, wherein the switching conversion mode is performed after the pre-charging mode.

3. The switching capacitor power conversion circuit of claim 1, wherein the first pre-charging period is earlier than the second pre-charging period.

4. The switching capacitor power conversion circuit of claim 1, wherein during a balance period, the switching capacitor power conversion circuit is further configured to operably control the first conversion transistor and the second conversion transistor, so as to balance a voltage of the conversion capacitor and a voltage of the output capacitor to the predetermined voltage level.

5. The switching capacitor power conversion circuit of claim 1, wherein the first conversion transistor and the second conversion transistor are connected in series to each other, wherein an end of the conversion capacitor, an end of the first conversion transistor and an end of the second conversion transistor are coupled to a switching node, wherein the output capacitor is coupled to another end of the second conversion transistor, and wherein during the second pre-charging period, the first conversion transistor is configured to operably supply at least the second pre-charging current to the switching node.

6. The switching capacitor power conversion circuit of claim 1, wherein the first predetermined current level is equal to the second predetermined current level, and wherein the load current is smaller than the second pre-charging current.

7. The switching capacitor power conversion circuit of claim 1, wherein in the pre-charging mode, the first conversion transistor is configured as a current source or a current clamper circuit, which is configured to operably supply the first pre-charging current.

8. The switching capacitor power conversion circuit of claim 1, wherein during the second pre-charging period, the second conversion transistor is configured as a current source or a current clamper circuit, which is configured to operably supply the second pre-charging current.

9. The switching capacitor power conversion circuit of claim 1, wherein subsequent to the first pre-charging period, it is determined whether a short circuit or a current leakage occurs in the conversion capacitor according to whether a voltage at a low-voltage end of the conversion capacitor exceeds a voltage threshold.

10. The switching capacitor power conversion circuit of claim 1, wherein subsequent to the second pre-charging period, it is determined whether a short circuit or a current leakage occurs in the output capacitor or whether the pre-charging operation on the output capacitor is unable to be finished according to whether the output voltage does not exceed a voltage threshold.

11. The switching capacitor power conversion circuit of claim 1, wherein the switching capacitor power conversion circuit is configured as the following:
the first conversion transistor, the second conversion transistor, a third conversion transistor and a fourth conversion transistor of the plurality of conversion transistors are connected in series in the listing order between the input power and the ground level, wherein the first conversion transistor and the second conversion transistor are coupled to an end of the conversion capacitor, whereas, the third conversion transistor and the fourth conversion transistor are coupled to another end of the conversion capacitor, and wherein the second conversion transistor, the third conversion transistor and the output capacitor are commonly coupled to the output node;
wherein in the switching conversion mode, the first conversion transistor, the second conversion transistor, the third conversion transistor and the fourth conversion transistor are configured to operably switch, such that the conversion capacitor is periodically electrically connected between the input power and the output node and the conversion capacitor is periodically electrically connected between the output node and the ground level, whereby the level of the voltage of the input power is two times the level of the voltage of the output power, whereas, the level of the current of the input power is ½ times the level of the current of the output power.

12. The switching capacitor power conversion circuit of claim 1, wherein in the switching conversion mode:
the voltage of the input power is a constant voltage and the voltage of the output power is also a constant voltage; or
the current of the input power is a constant current and the current of the output power is also a constant current.

13. A conversion control circuit, which is configured to operably control a conversion capacitor and an output capacitor, so as to convert an input power to an output power at an output node, wherein the output capacitor is coupled to the output node; the conversion control circuit comprising:
a plurality of conversion transistors, which are coupled to the conversion capacitor;
a pre-charging control circuit, which is configured to operably control the plurality of conversion transistors in a pre-charging mode; and
a switching control circuit, which is configured to operably control the plurality of conversion transistors in a witching conversion mode;
wherein in the switching conversion mode, the plurality of conversion transistors are configured to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times of a level of a voltage of the output power, whereas, a level of a current of the input power is 1/k times of a level of a current of the output power, wherein k is a real number greater than one;
wherein in the pre-charging mode, the pre-charging control circuit is configured to operably control the plurality of conversion transistors to perform following pre-charging operations, wherein:
during a first pre-charging period, the switching capacitor power conversion circuit is configured to operably control a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and
during a second pre-charging period, the switching capacitor power conversion circuit is configured to operably control a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit;
wherein the first pre-charging current is not greater than a first predetermined current level, whereas, the second pre-charging current is not greater than a second predetermined current level, and wherein the load current is not smaller than a third predetermined current level.

14. The conversion control circuit of claim 13, wherein the switching conversion mode is performed after the pre-charging mode.

15. The conversion control circuit of claim 13, wherein the first pre-charging period is earlier than the second pre-charging period.

16. The conversion control circuit of claim 13, wherein during a balance period, the conversion control circuit is further configured to operably control the first conversion transistor and the second conversion transistor, so as to balance a voltage of the conversion capacitor and a voltage of the output capacitor to the predetermined voltage level.

17. The conversion control circuit of claim 13, wherein the first conversion transistor and the second conversion transistor are connected in series to each other, wherein an end of the conversion capacitor, an end of the first conversion transistor and an end of the second conversion transistor are coupled to a switching node, wherein the output capacitor is coupled to another end of the second conversion transistor, and wherein during the second pre-charging period, the first conversion transistor is configured to operably supply at least the second pre-charging current to the switching node.

18. The conversion control circuit of claim 13, wherein the first predetermined current level is equal to the second predetermined current level, and wherein the load current is smaller than the second pre-charging current.

19. The conversion control circuit of claim 13, wherein in the pre-charging mode, the first conversion transistor is configured as a current source or a current clamper circuit, which is configured to operably supply the first pre-charging current.

20. The conversion control circuit of claim 13, wherein during the second pre-charging period, the second conversion transistor is configured as a current source or a current clamper circuit, which is configured to operably supply the second pre-charging current.

21. The conversion control circuit of claim 13, wherein subsequent to the first pre-charging period, it is determined whether a short circuit or a current leakage occurs in the conversion capacitor according to whether a voltage at a low-voltage end of the conversion capacitor exceeds a voltage threshold.

22. The conversion control circuit of claim 13, wherein subsequent to the second pre-charging period, it is determined whether a short circuit or a current leakage occurs in the output capacitor or whether the pre-charging operation on the output capacitor is unable to be finished according to whether the output voltage does not exceed a voltage threshold.

23. The conversion control circuit of claim 13, wherein the conversion control circuit is configured as the following:
the first conversion transistor, the second conversion transistor, a third conversion transistor and a fourth conversion transistor of the plurality of conversion transistors are connected in series in the listing order between the input power and the ground level, wherein the first conversion transistor and the second conversion transistor are coupled to an end of the conversion capacitor, whereas, the third conversion transistor and the fourth conversion transistor are coupled to another end of the conversion capacitor, and wherein the second conversion transistor, the third conversion transistor and the output capacitor are commonly coupled to the output node;
wherein in the switching conversion mode, the first conversion transistor, the second conversion transistor, the third conversion transistor and the fourth conversion transistor are configured to operably switch, such that the conversion capacitor is periodically electrically connected between the input power and the output node and the conversion capacitor is periodically electrically connected between the output node and the ground level, whereby the level of the voltage of the input power is two times the level of the voltage of the output power, whereas, the level of the current of the input power is ½ times the level of the current of the output power.

24. The conversion control circuit of claim 13, wherein in the switching conversion mode:
the voltage of the input power is a constant voltage and the voltage of the output power is also a constant voltage; or
the current of the input power is a constant current and the current of the output power is also a constant current.

25. A control method, which is configured to operably control operations of the plurality of conversion transistors, a conversion capacitor and an output capacitor, so as to convert an input power to an output power at an output node, wherein the output capacitor is coupled to the output node; the control method comprising:
in a switching conversion mode, controlling the plurality of conversion transistors to operably switch an electrical connection relationship of the conversion capacitor, such that the conversion capacitor is periodically electrically connected between one of at least one divided-voltage node and the input power, or between one of the at least one divided-voltage node and a ground level, or between a pair of the at least one divided-voltage node when the at least one divided-voltage node includes two or more divided-voltage nodes, thereby converting the input power to the output power, wherein the output node corresponds to a node of the at least one divided-voltage node, wherein in a steady state, a level of a voltage of the input power is k times of a level of a voltage of the output power, whereas, a level of a current of the input power is 1/k times of a level of a current of the output power, wherein k is a real number greater than one;
in a pre-charging mode, controlling the plurality of conversion transistors to perform a pre-charging operation, wherein the pre-charging operation includes following steps:
during a first pre-charging period, controlling a first conversion transistor of the plurality of conversion transistors, so as to provide a first pre-charging current to pre-charge the conversion capacitor to a predetermined voltage level, wherein during the first pre-charging period, the first pre-charging current is prevented from charging the output capacitor; and
during a second pre-charging period, controlling a second conversion transistor of the plurality of conversion transistors, so as to provide a second pre-charging current via the output node to pre-charge the output capacitor to the predetermined voltage level, wherein during the second pre-charging period, the second pre-charging current is configured to operably supply a load current to a load circuit;
wherein the first pre-charging current is not greater than a first predetermined current level, whereas, the second pre-charging current is not greater than a second predetermined current level, and wherein the load current is not smaller than a third predetermined current level.

26. The control method of claim 25, wherein the switching conversion mode is performed after the pre-charging mode.

27. The control method of claim 25, wherein the first pre-charging period is earlier than the second pre-charging period.

28. The control method of claim 25, wherein the pre-charging operation further includes a following step:
during a balance period, controlling the first conversion transistor and the second conversion transistor, so as to balance a voltage of the conversion capacitor and a voltage of the output capacitor to the predetermined voltage level.

29. The control method of claim 25, wherein the first predetermined current level is equal to the second predetermined current level, and wherein the load current is smaller than the second pre-charging current.

30. The control method of claim 25, wherein the pre-charging operation further includes a following step:
   subsequent to the first pre-charging period, determining whether a short circuit or a current leakage occurs in the conversion capacitor according to whether a voltage at a low-voltage end of the conversion capacitor exceeds a voltage threshold.

31. The control method of claim 25, wherein the pre-charging operation further includes a following step:
   subsequent to the second pre-charging period, determining whether a short circuit or a current leakage occurs in the output capacitor or whether the pre-charging operation on the output capacitor is unable to be finished according to whether the output voltage does not exceed a voltage threshold.

* * * * *